(12) United States Patent
Lemke et al.

(10) Patent No.: US 9,716,591 B2
(45) Date of Patent: Jul. 25, 2017

(54) METHOD FOR SETTING UP A SECURE CONNECTION BETWEEN CLIENTS

(71) Applicants: Deutsche Post AG, Bonn (DE); Fraunhofer-Gesellschaft Zur Forderung Der Angewandten Forschung E.V., Munich (DE)

(72) Inventors: Harald Lemke, Hamburg (DE); Marcel Kulicke, Munich (DE); Angelika Schneider, Feldkirchen (DE); Yves Hetzer, Erfurt (DE)

(73) Assignees: Deutsche Post AG, Bonn (DE); Fraunhofer-Gesellschaft Zur Forderung Der Angewandten Forschung E.V., Munich (DE)

( * ) Notice: Subject to any disclaimer, the term of this patent is extended or adjusted under 35 U.S.C. 154(b) by 34 days.

(21) Appl. No.: 14/649,331

(22) PCT Filed: Nov. 28, 2013

(86) PCT No.: PCT/EP2013/074952
§ 371 (c)(1),
(2) Date: Jun. 3, 2015

(87) PCT Pub. No.: WO2014/086654
PCT Pub. Date: Jun. 12, 2014

(65) Prior Publication Data
US 2015/0326395 A1    Nov. 12, 2015

(30) Foreign Application Priority Data
Dec. 6, 2012 (DE) .................. 10 2012 111 903

(51) Int. Cl.
G06F 21/00 (2013.01)
H04L 9/32 (2006.01)
(Continued)

(52) U.S. Cl.
CPC ............ *H04L 9/321* (2013.01); *H04L 9/0827* (2013.01); *H04L 9/30* (2013.01); *H04L 9/3215* (2013.01);
(Continued)

(58) Field of Classification Search
CPC ..................................................... H04L 9/321
See application file for complete search history.

(56) References Cited

U.S. PATENT DOCUMENTS 8,180,051 B1 * 5/2012 O'Toole, Jr. .......... G06F 21/556
                                                      341/22
2004/0117615 A1 * 6/2004 O'Donnell .............. G06F 21/10
                                                      713/155

(Continued)

FOREIGN PATENT DOCUMENTS

EP          1722532 A2     11/2006

OTHER PUBLICATIONS

N. Saxena et al; Secure Device Pairing based on a Visual Channel; 2006 IEEE Symposium on Security and Privacy (S&P 2006); Jan. 1, 2006, pp. 6 pp. -313, XP055100742, DOI: 10.1109/SP.2006.35; ISBN: 978-O-76-952574-7 figure 1.

*Primary Examiner* — Morshed Mehedi
(74) *Attorney, Agent, or Firm* — Woodard, Emhardt, Moriarty, McNett & Henry LLP

(57) ABSTRACT

The invention relates to a method for authorizing a second client (C2) to a server (S) for a user account for setting up a secure connection between the second client (C2) and a first client (C1).

20 Claims, 5 Drawing Sheets

(51) Int. Cl.
*H04L 29/06* (2006.01)
*H04L 9/30* (2006.01)
*H04L 9/08* (2006.01)

(52) U.S. Cl.
CPC .......... *H04L 9/3226* (2013.01); *H04L 9/3236* (2013.01); *H04L 63/0435* (2013.01)

(56) References Cited

U.S. PATENT DOCUMENTS

2011/0289313 A1* 11/2011 Lowekamp ......... H04L 63/0807
713/155
2011/0296508 A1 12/2011 Os et al.
2013/0219166 A1* 8/2013 Ristov ................. H04L 63/0853
713/151

* cited by examiner

METHOD FOR SETTING UP A SECURE CONNECTION BETWEEN CLIENTS

CROSS-REFERENCE TO RELATED APPLICATIONS

This application is the U.S. national stage application of International Patent Application No. PCT/EP2013/074952, filed Nov. 28, 2013, which claims priority of German Application No. 10 2012 111 903.1, filed Dec. 6, 2012, which are both hereby incorporated by reference.

BACKGROUND

The invention relates to a method for authorising a second client to a server for a user account for setting up a secure connection between the second client and a first client.

Trustworthy communication between different subscribers in the Internet is a challenge due to the lack of trustworthiness of the medium constituted by the Internet and of the communication channels thereof. In order to nevertheless ensure trustworthiness, asymmetric cryptographic methods are generally used, in which an exchange of the public keys between the clients, i.e. between computers, servers, tablet PCs, smart phones, etc., is necessary before an exchange.

The security of such a method is dependent on whether or not the exchange of the keys is compromised, i.e. whether the clients can be certain that the public key also actually originates from the other client and vice versa. This uncertainty is utilised actively inter alia by man-in-the-middle attacks.

In order to avoid such attacks, two different solution approaches are used. On the one hand what is known as a public key infrastructure (PKI) can be used, in which a PKI service provider acts as notary and assures the authenticity of the keys. On the other hand the clients can be organised in what is known as a peer-to-peer network, in which the clients communicate directly with one another without service provider arranged between and exchange their keys under their own responsibility.

However, neither method is considered for the operator of an Internet service for particularly secure and trustworthy communication. This is because the operator cannot be simultaneously both the PKI operator and the notary, because he would therefore at least technically be able to compromise the trustworthiness of his own service, by accident or as the result of a successful attack, over his infrastructure. From a technical viewpoint, this would then be no more than an "end-to-end encryption".

On the other hand the use of an external PKI infrastructure would place the business model of the operator at risk, because the service thereof in the fundamental area of production of a relationship of trust between the clients of the user is dependent on third parties. In addition, the trust problem would thus only be transferred to these third parties, and would generally continue to exist.

Lastly, the use of a fundamentally open peer-to-peer network also conflicts with the economical interests of the operator. In addition, the operator takes incalculable risks, because he is responsible for the quality and the security of his service, and the secure authorisation of the subscribers forms the basis of his value proposition.

In the prior art there are a multitude of symmetric and asymmetric encryption methods in a wide range of strengths and lengths. The known symmetric methods include, in particular, AES (Advanced Encryption Standard), DES/3DES (Data Encryption Standard), IDEA (International Data Encryption Algorithm), Blowfish, Twofish, CAST-* (Carlisle Adams Stafford Tavares) and RC* (Rivest Cipher), whereas known asymmetric methods include, in particular, RSA (Rivest Shamir Aldeman), Elgamal, Merkle-Hellmann and Rabin.

These methods, however, have systemic weaknesses. In the case of symmetric methods the key to be encrypted is identical to the key to be decrypted. This, in the case of message transfer, places high demands on the key exchange between the involved parties. In the case of asymmetric methods there are indeed separate keys for the encryption and decryption, however the subscribers involved in an encrypted message exchange must ensure that their key also actually corresponds to that of the other subscriber and that a third party has not intervened in the communication and the communication in this regard can no longer be considered to be secure.

Especially when safeguarding secrets, such as passwords or transaction numbers, separate methods, or what are known as hash methods, are used. By means of hash methods it is possible to verify whether a provided secret matches the secret that has been transmitted by a subscriber or a system. With hash methods this verification can be performed without storing the secret itself. Instead, only the result of a preferably low-conflict or free function is stored, the input of which was the secret plus a random number. This increases the security of the secret, because a compromise of the memory system of this secret does not lead to a compromise of the secret itself.

In order to solve the trust problem in asymmetric encryption methods, various methods also exist, such as Kerberos, PGP, Off-The-Record Messaging, S/MIME or Public Key Infrastructure.

SUMMARY

Proceeding from the above-mentioned problems, the object of the invention is to provide a method, such that only authorised clients can decrypt and therefore read messages, but not an unauthorised server or other third party.

The object is achieved in accordance with the invention by the features of the independent claims. Advantageous embodiments of the invention are specified in the dependent claims.

The object is therefore achieved by a method for authorising a second client to a server for a user account for setting up a secure connection between the second client and a first client, wherein the method comprises the steps of:
  a) generating a random number by the first client,
  b) indicating the random number by the first client,
  c) generating a first hash value from the random number by the first client, wherein the first hash value comprises a symmetric key, a password, and an initialisation vector,
  d) generating, by the first client, a first data packet from a name of the user account, from a first public key of the first client, and from a hash value of the first public key,
  e) encrypting the first data packet by means of the symmetric key and the initialisation vector by the first client,
  f) generating a second hash value from the password with use of the initialisation vector as salt by the first client,
  g) transmitting the encrypted first data packet and the second hash value from the first client to the server, h) receiving, by a second client, the name of the user account and the random number from an input means of the second client, i) generating the first hash value from the random number received via input means by the second client, wherein the first hash value comprises the symmetric key, the password, and the initialisation vector, j) generating the second hash value from the password with use of the initialisation vector as salt by the second client, k) transmitting the second hash value from the second client to the server, l) comparing the second hash value obtained from the first client with the second hash value obtained from the second client through the server and, if said values match, transmitting the encrypted first data packet through the server to the second client, m) decrypting the encrypted first data packet by means of the symmetric key and the initialisation vector by the second client in order to obtain a decrypted name of the user account, a decrypted second public key, and a decrypted hash value of the second public key, n) comparing, by the second client, the decrypted name of the user account with the name of the user account received via input means, the decrypted public key with the first public key of the first client, and/or the decrypted hash value with the hash value of the first public key of the first client.

The essential point of the invention is therefore that the trustworthiness of the client, i.e. for example software running on IT systems, such as an app on a tablet PC, is achieved via different encryption methods and also an additional secret (the random number), which is known only to the clients and users thereof. This forms the basis of a user account that is linked to the clients used by the user. A trust group among the clients is thus created, in which each of the involved clients can be certain that each of the other participating clients is trustworthy or that messages exchanged between the clients cannot be decrypted, whereas the server, due to a lack of knowledge of the secret, i.e. the random number, cannot decrypt messages exchanged between the clients.

An explicit inclusion of a further client in the group is implemented in the form of an authorisation by the user with the aid of the secret. Once this process has been concluded, the clients are in possession of a cryptographic key originating with certainty from the included other client, with which key encrypted messages can then be exchanged between the clients.

The exchange of messages is achieved in this method via a central server. However, the server is not a trustworthy entity and must therefore be considered as potentially compromised, similarly to the used communication channels. There must therefore be no possibility for the central server to be able to decrypt or read the messages exchanged between the clients. The exchanged messages are encrypted via an asymmetric encryption method, in which the clients of the subscribers exchange their public keys with one another. Provided the method is now terminated successfully in accordance with step n), messages can be securely exchanged between the authorised clients. The method can of course also be used for more than two clients, as is clear intuitively and directly to the person skilled in the art.

As a result of the method it is ensured that only those clients that a user has authorised with the aid of a client already authorised for the user account can decrypt and therefore read the messages. The server is not able, intentionally or unintentionally, to integrate into the user account a client not authorised for the user account. The method is thus particularly advantageous for applications that are subject to particular confidentiality obligations, such as §203 StGB (German Criminal Code). The method thus ensures that the authorisation of clients for a user account takes place under the full control of the user. Here, the operator of the server is unable to compromise the authorisation process or to authorise another client for the user account without authority.

The individual steps of the method are preferably carried out in succession, i.e., by way of example, step b) is only carried out after step a). The random number is preferably indicated on an indication means of the client, for example on a display or a monitor. The name of the user account preferably includes a plurality of alphanumeric characters, whereas the public key is generated by means of methods known from the art, as discussed previously. The first client is rather particularly preferably authorised already to the server for the user account in question before the method is begun. The first client, the second client and the server are also preferably interconnected, for example via LAN or WLAN, within a computer network for the exchange of information and messages. The input means is preferably configured as a keyboard or touchscreen display, such that the user can input the random number on the second client within the scope of step h) by means of the input means.

In accordance with a preferred embodiment the method comprises the following further steps of:

o) generating, by the second client, a second data packet from the name of the user account, from a second public key of the second client, and from a hash value of the second public key, p) encrypting the second data packet by means of the symmetric key and the initialisation vector by the second client, q) transmitting the encrypted second data packet from the second client to the server, r) transmitting the encrypted second data packet from the server to the first client, s) decrypting the encrypted second data packet by means of the symmetric key and the initialisation vector by the first client in order to obtain a decrypted name of the user account, a decrypted second public key, and a decrypted hash value of the second public key, t) comparing, by the first client, the decrypted name of the user account with the name of the user account, the decrypted second public key with the second public key of the second client, and the decrypted hash value with the hash value of the second public key of the second client.

When the integrity of the second data packet is verified, the first client can be sure that the public key of the second client actually originates from the second client, such that trustworthy messages can be exchanged between the clients.

In accordance with a further preferred embodiment step d) also comprises the step of: generating the first data packet from a time stamp, step e) also comprises the step of: decrypting the encrypted first data packet in order to obtain a decrypted time stamp, and step n) also comprises the step of: comparing the decrypted time stamp with an actual time stamp. It is additionally preferred if step o) also comprises the step of: generating the second data packet from a time stamp, step s) also comprises the step of: decrypting the encrypted second data packet in order to obtain a decrypted time stamp, and step t) also comprises the step of: comparing the decrypted time stamp with an actual time stamp.

By comparing the obtained decrypted time stamp with an actual time stamp, a potential replay attack can be identified and out-dated data packets are discarded. This is advantageous since otherwise a possible attacker would have unlimited time to decipher the data packet using brute force methods.

In principle, the first hash value can be determined using any method known from the prior art for generating a cryptologic hash function. However, in the present case it is particularly preferred that the first hash value is generated by means of SHA-1, SHA-2 and/or SHA-3, the symmetric key has a key length 256 bits, the password has a length≥128 bits and/or the initialisation vector has a length of 128 bits. In addition, greater lengths can preferably also be used, wherein the hash value is particularly preferably determined by means of SHA-384. At the aforementioned lengths, the first 256 bits of the SHA-384 hash value preferably constitute the symmetric key, bits 129 to 256 constitute the password, and bits 257 to 384 constitute the initialisation vector.

The encryption and/or decryption of the data packet is/are preferably carried out by AES-256, wherein even more secure symmetric methods can also be used. The generation of the second hash value from the password is preferably carried out with use of the initialisation vector as salt by means of 10, preferably 20, and particularly preferably ≥50 bcrypt rounds. In this regard the initialisation vector is preferably appended to the password before the hash value is determined in order to increase the entropy of the input. Besides bcrypt, further cryptologic or hash functions can also be used. The random number in principle can be of any length, wherein the random number preferably has a length of 24 alphanumeric characters. Step b) also preferably comprises the presentation of the random number in Base-64-encoded form, preferably on an indication means.

The object of the invention is also achieved by a method for exchanging encrypted messages between a first client and a second client, having the steps of:

authorising the second client to a server in accordance with a method as described previously, encrypting a message on the first client using an asymmetric encryption method, transmitting the encrypted message from the first client to the second client, and decrypting the message on the second client by means of an asymmetric decryption method.

As a result of the method, messages can be exchanged in encrypted form between the clients without the server having access to the contents of the messages.

The object of the invention is also achieved by a computer system comprising a server, a first client and at least one second client, wherein the server, the first client and the second client are configured in such a way that a method as described previously is executed on the server, the first client and the second client.

In addition, the object of the invention is achieved by a digital storage medium having electronically readable control signals, wherein the control signals can cooperate with a programmable computer system such that a method as described previously is executed.

Lastly, the object of the invention is achieved by a computer program product having a program code stored on a machine-readable carrier for carrying out the method as described previously when the program code is executed on a data processing device.

The invention will be explained in greater detail hereinafter with reference to the accompanying drawing on the basis of a preferred embodiment.

DETAILED DESCRIPTION OF THE DRAWINGS

Figure 3:
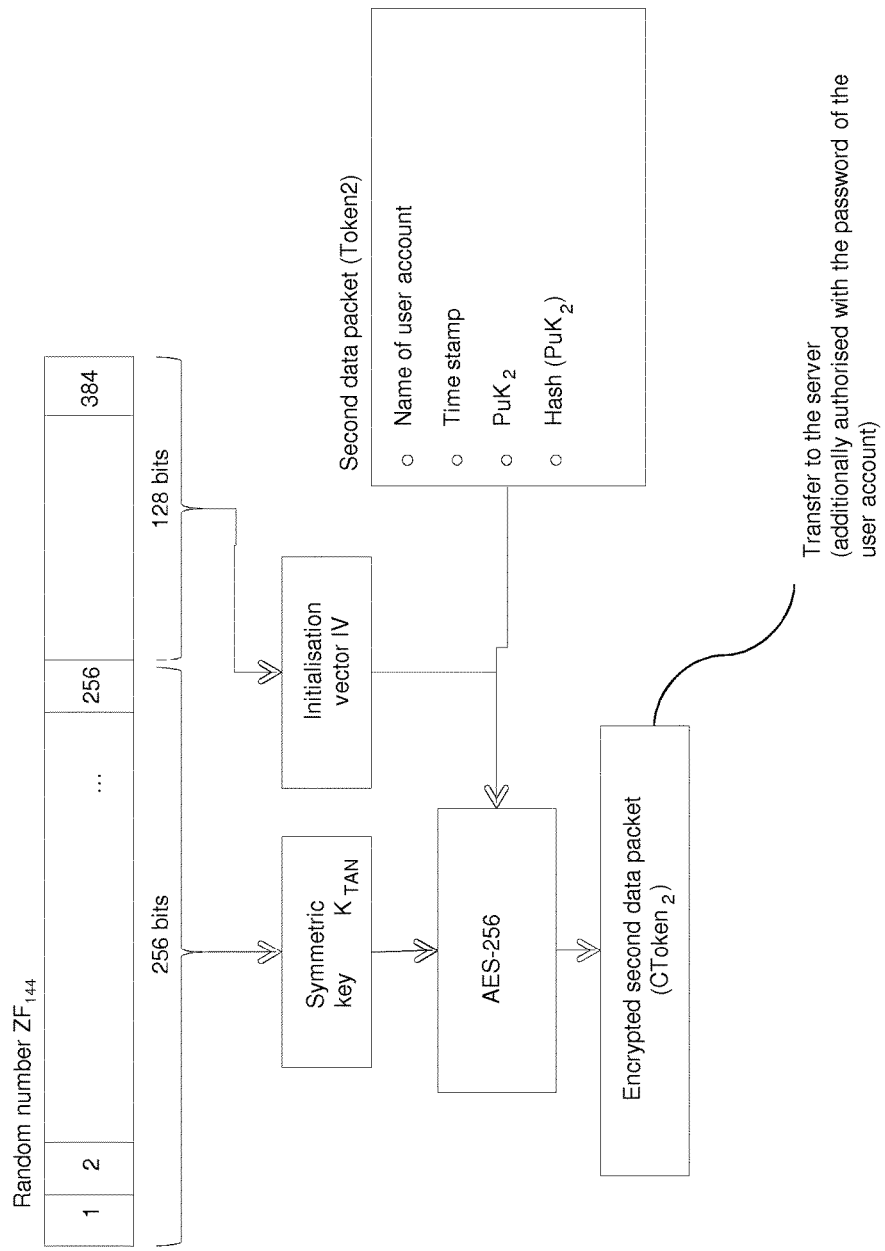
FIG. 3 shows a schematic sequence for generating a second data packet at the second client in accordance with the preferred exemplary embodiment of the invention.
Figure 4:
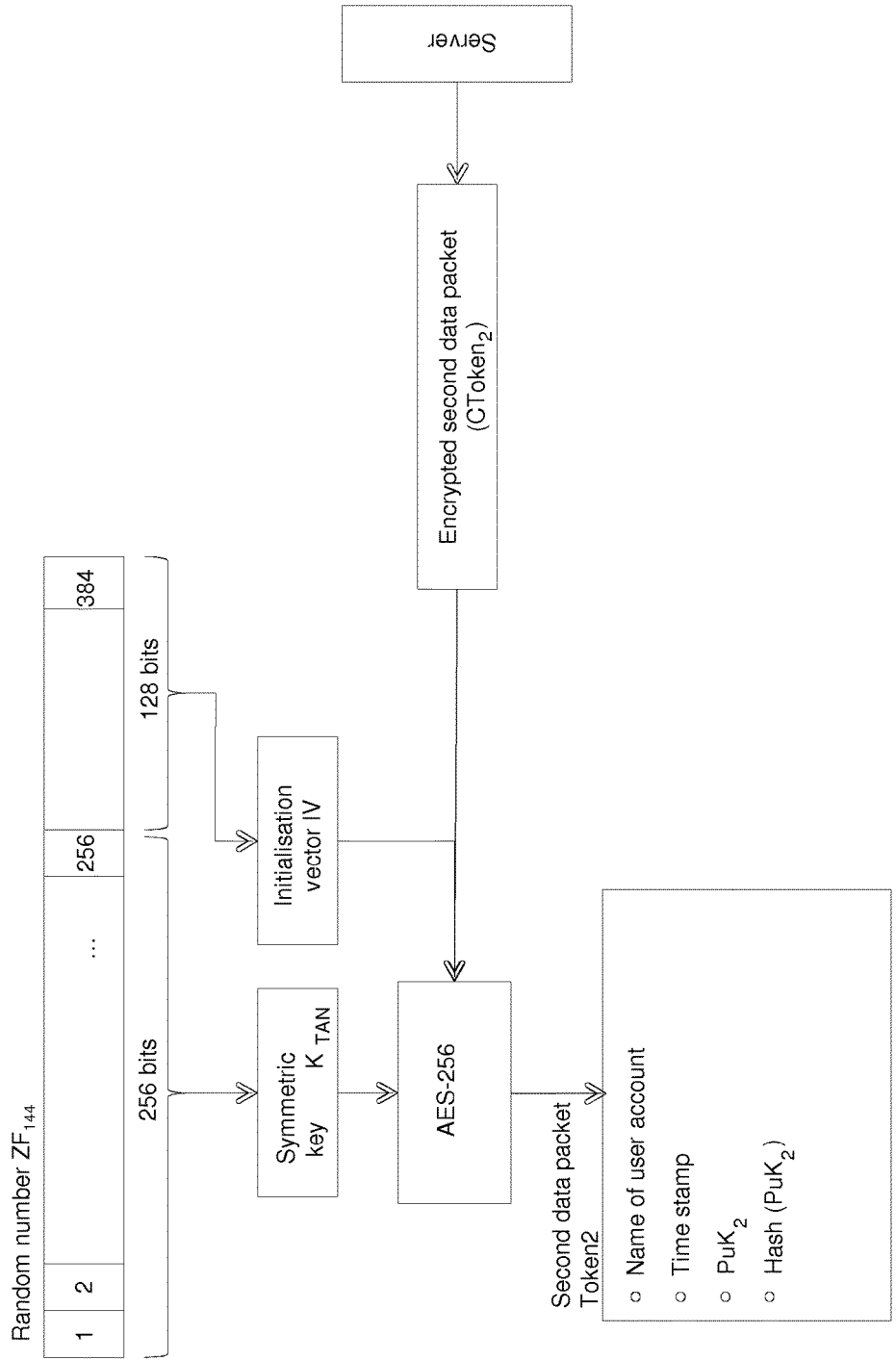
FIG. 4 shows a schematic sequence for decrypting and checking the second data packet at the first client in accordance with the preferred exemplary embodiment of the invention.
Figure 5:
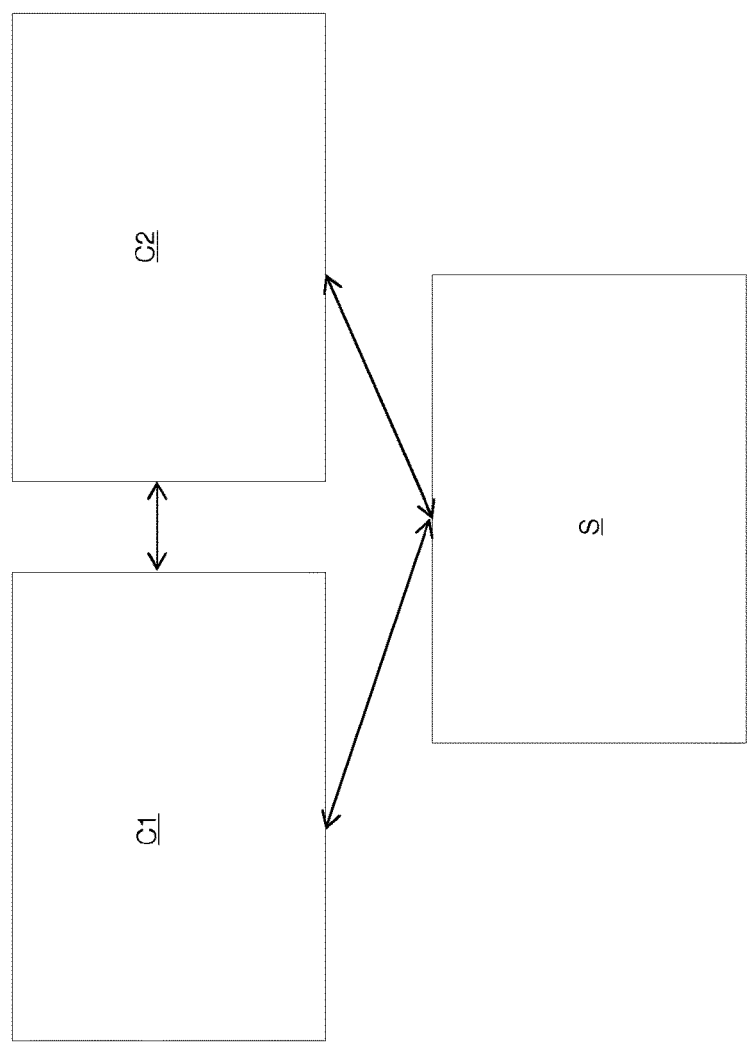
FIG. 5 shows an overview of the communication between the first client, the second client and the server in accordance with the preferred exemplary embodiment of the invention.

FIGS. 1 to 4 show a schematic sequence of a method for the secure authorisation of clients C1, C2 in a network, which has, besides the clients C1, C2, a server S, as shown in FIG. 5. In the present case the clients C1, C2 are configured as an iPad and a PC, on each of which a software for executing the following method is running in the form of an app.

The server S manages a user account, for which the client C1 is authorised. So that the first client C1 can now exchange encrypted documents with the second client C2 and also store and process said documents in a secure manner, the second client C2 must be authorised to the server for the user account.

Figure 1:
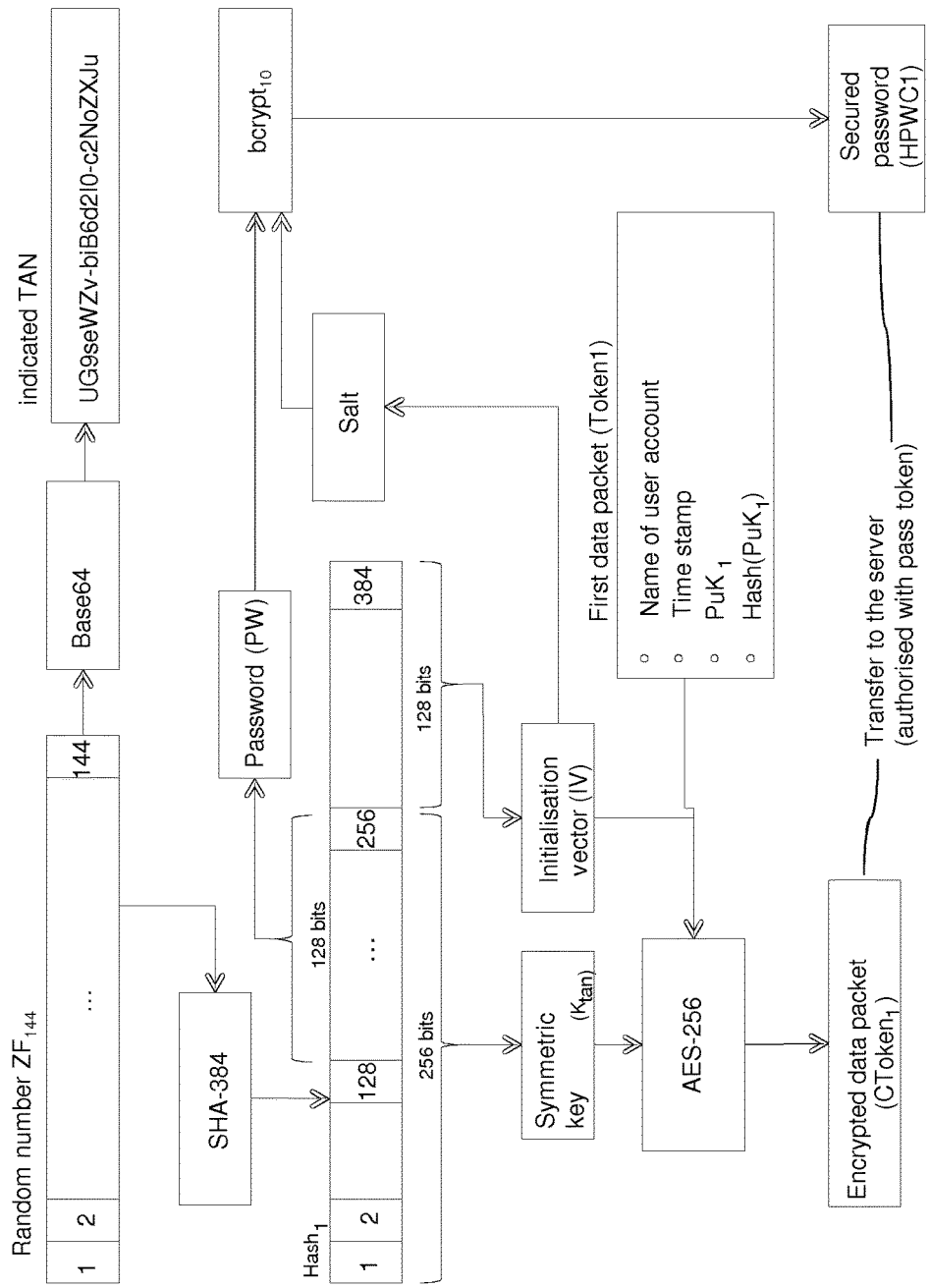
FIG. 1 shows a schematic sequence for initialisation and transfer of a first data packet from a first client to a server in accordance with a preferred exemplary embodiment of the invention.

To this end, as shown in FIG. 1, a 24-digit random number ZF is generated on the first client C1 and is indicated in Base64-encoded form on the first client C1 as transaction number TAN on a display of the client C1. A 384-bit number is generated as first hash value Hash1 from the random number ZF by means of SHA-384. The first hash value Hash1 comprises a 256-bit symmetric AES key Ktan, a 128-bit password PW, and a 128-bit initialisation vector IV.

Then, a first data packet Token1 is generated on the first client C1, said data packet consisting of a name of the user account, a time stamp with the current time of the first client C1, a first public key PuK1 of the first client C1, and also a hash value of the first public key of PuK1.

The first data packet Token1 is encrypted by means of the symmetric key Ktan and the initialisation vector IV as encrypted first data packet CToken1. The initialisation vector IV is additionally used as salt in order to produce, with 10 bcrypt rounds, a second hash value HPWC1 from the password PW.

Once the aforementioned steps have been carried out on the first client C1, the first client C1 transmits the encrypted first data packet CToken1 and the second hash value HPWC1 to the server S. The server S stores the received encrypted first data packet CToken1 and the second hash value HPWC1. The server S has neither the random number ZF nor the transaction number TAN, and therefore the server S itself cannot decrypt the first data packet CToken1.

The random number ZF or transaction number TAN displayed y the first client C1 on a display of the first client C1 is input by a user on the second client C2 together with the name of the user account by means of an input means, for example a keyboard or a touch-sensitive display. There is thus no direct exchange, but instead only a manual exchange of the random number ZF or transaction number TAN and the name of the user account between the first client C1 and the second client C2, for example there is thus no electronically automated exchange via a network.

The client C2 then generates the password PW from the input random number ZF or from the transaction number TAN in a manner identical to that as before on the first client C1 and transfers this as hash value HPWC2 to the server S. When the password PW coded in this way is correct following a check by the server S, the server C1 transfers the encrypted first data packet CToken1 to the second client C2.

Figure 2:
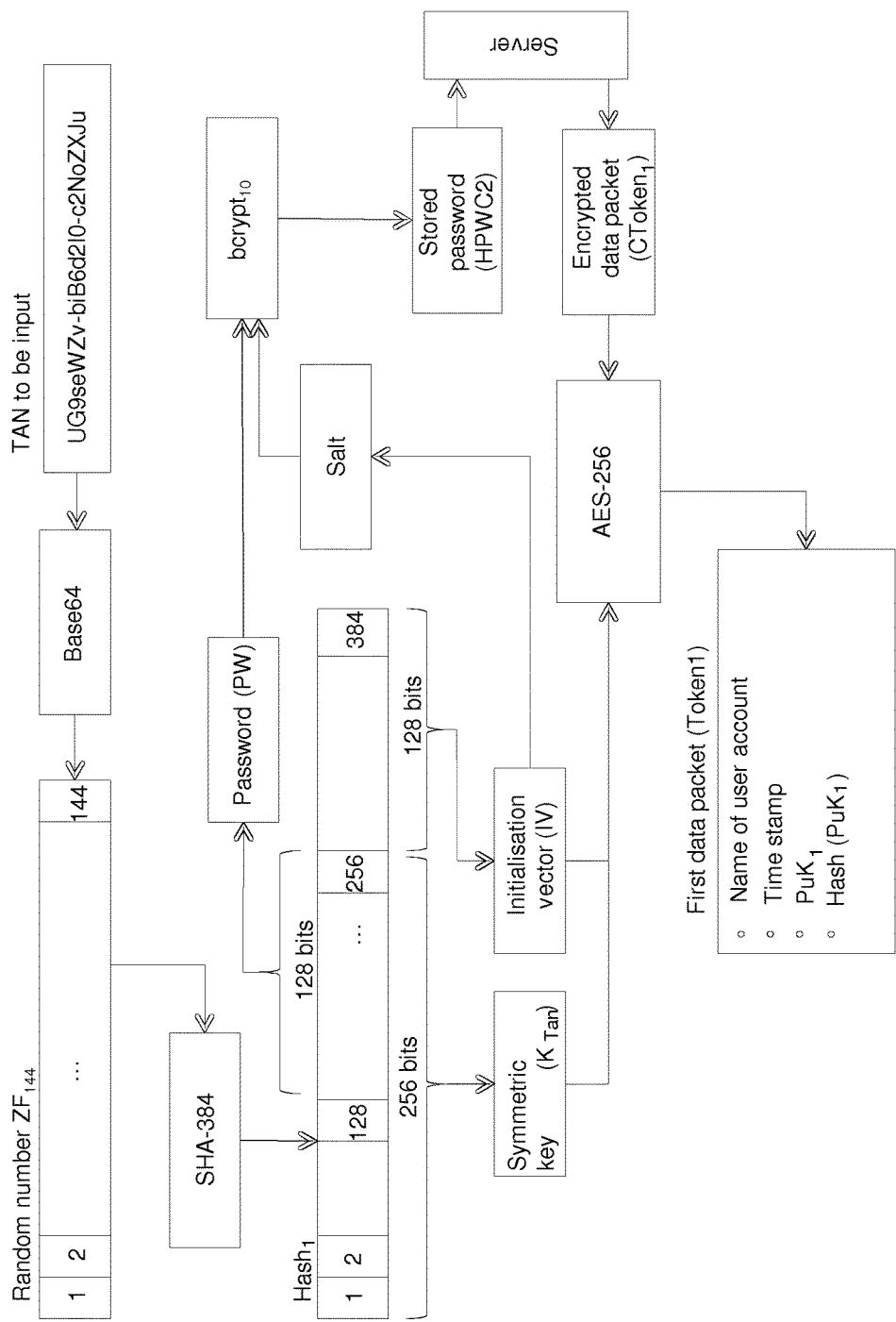
FIG. 2 shows a schematic sequence for decrypting and checking the first data packet by a second client in accordance with the preferred exemplary embodiment of the invention.

To this end, specifically, a 384-bit number is first generated on the second client C2 by means of SHA-384. The first hash value Hash1 comprises the symmetric 256-bit AES key Ktan, the 128-bit password PW, and the 128-bit initialisation vector IV, as shown in FIG. 2. A compromised server S could indeed distribute the encrypted first data packet CToken1 to unauthorised clients, however these cannot start anything with the encrypted first data packet CToken1 without the transaction number TAN or the random number ZF.

The second client 2 then decrypts the encrypted first data packet CToken1 in a method identical or similar to that used to encrypt the first data packet Token1 on the first client C1. The integrity of the decrypted first data packet Token1 is then checked. Together with the initialisation vector IV, which is used as salt, the second hash value HPWC2 of the password PW is calculated by means of what is known as a secure hash method. The resultant character sequence (the second hash value HPWC2) is transferred to the server S. When the second hash value HPWC2 calculated by the second client 2 matches the second hash value HPWC1 obtained from the first client 1 and stored on the server S with the previous step, the server S then transfers the encrypted first data packet CToken1 to the second client C2.

The method for calculating the second hash value HPCW1, HPCW2 preferably has an adjustable cost factor for the outlay associated with the hash value calculation. The higher is this factor, the more costly is the creation of the hash value HPCW1, HPCW2, and the better can be ensured a sufficient security for the period of validity of this method.

When the integrity of the first data packet Token1 is verified in such a way, the second client C2 can be sure that the public key PuK1 of the first client C1 actually originates from the first client C1. The second client C2 can also check the time stamp and discard out-dated data packets Token1, because a possible attacker would then have too much time to decipher the data packet Token1 using brute force methods.

Once the second client C2 has verified the first data packet Token1 as previously described, the second client C2 generates a second data packet Token2 with the name of the user account, a time stamp with the current time, a second public key PuK2 of the second client C2, and a hash value of the second public key PuK2 of the second client C2, as shown in FIG. 3. The second data packet Token2 is then encrypted using the symmetric key Ktan derived from the random number ZF or the transaction number TAN and also using the initialisation vector IV. The resultant encrypted second data packet CToken2 is then transferred by the second client C2 to the server S.

The server S holds ready the encrypted second data packet CToken2 for the client C1. The server S is unable to decrypt the encrypted second data packet CToken2 because the server S does not know the symmetric key Ktan derived from the random number ZF or the transaction number TAN.

Once the first client C1 has received the encrypted second data packet CToken2 from the server S, the first client C1 performs the previously described verification, similarly to the second client C2, as illustrated in FIG. 4. Specifically, the second encrypted data packet CToken2 is decrypted with the symmetric key Ktan derived from the random number ZF or the transaction number TAN and also with the initialisation vector IV. When the integrity of the second data packet Token 2 is verified in such a way by comparison of the names of the user account, the decrypted second public key PuK2, and also the decrypted hash values of the second public key PuK2, the first client C1 can be sure that the second public key PuK2 actually originates from the second client C2.

The first client 1 can also compare the time stamp with its actual time and thus identify any replay attacks and discard out-dated second data packets Token2. This is advantageous because a possible attacker otherwise would have unlimited time to decipher the second data packet Token2 using brute force methods.

In the case of a positive check from the previous step the pairing of the clients C1, C2 is concluded successfully. The clients C1, C2 have exchanged their respective public keys PuK1, PuK2 in a secure manner over an insecure channel and can now exchange messages in end-to-end encrypted manner over the server S with the aid of the public keys PuK1, PuK2, which messages also cannot be decrypted by the server S.

The above-described method can also be used for further clients, wherein an additional exchange of the public keys of the clients not involved in the authentication method must then be performed for this purpose in order to enable a secure communication between all clients C1, C2. This, however, can be easily implemented, since the previously described key exchange from the client C1 that is already authenticated to the additional client that is to be authenticated can be performed easily in the form of a message encrypted with the public key of the client in question.

LIST OF REFERENCE SIGNS server S
first client C1
second client C2
random number ZF
first hash value Hash1
second hash value of the first client HPWC1
second hash value of the second client HPWC2
symmetric key Ktan
password PW
initialisation vector IV
first data packet Token1
encrypted first data packet CToken1
second data packet Token2
encrypted second data packet CToken2
first public key PuK1
second public key PuK2

The invention claimed is:
1. A method for authorising a second client to a server for a user account for setting up a secure connection between the second client and a first client, wherein the method comprises the steps of:

a) generating a random number by the first client,
b) displaying the random number by the first client,
c) generating a first hash value from the random number by the first client, wherein the first hash value comprises a symmetric key, a password, and an initialisation vector,
d) generating, by the first client, a first data packet from a name of the user account, from a first public key of the first client, and from a hash value of the first public key,
e) encrypting the first data packet by means of the symmetric key and the initialisation vector by the first client,
f) generating a second hash value from the password with use of the initialisation vector as salt by the first client,
g) transmitting the encrypted first data packet and the second hash value from the first client to the server,
h) receiving, by a second client, the name of the user account and the random number from an input means of the second client,
i) generating the first hash value from the random number received via input means by the second client, wherein the first hash value comprises the symmetric key, the password, and the initialisation vector,
j) generating the second hash value from the password with use of the initialisation vector as salt by the second client,
k) transmitting the second hash value from the second client to the server,
l) comparing the second hash value obtained from the first client with the second hash value obtained from the second client through the server and, if the values match, transmitting the encrypted first data packet through the server to the second client,
m) decrypting the encrypted first data packet by means of the symmetric key and the initialisation vector by the second client in order to obtain a decrypted name of the user account, a decrypted second public key, and a decrypted hash value of the second public key,
n) comparing, by the second client, the decrypted name of the user account with the name of the user account received via input means, the decrypted public key with the first public key of the first client, and/or the decrypted hash value with the hash value of the first public key of the first client and, if the values match, authorising the second client to the server.

2. The method according to claim 1, comprising the steps of:
o) generating, by the second client, a second data packet from the name of the user account, from a second public key of the second client, and from a hash value of the second public key,
p) encrypting the second data packet by means of the symmetric key and the initialisation vector by the second client,
q) transmitting the encrypted second data packet from the second client to the server,
r) transmitting the encrypted second data packet from the server to the first client,
s) decrypting the encrypted second data packet by means of the symmetric key and the initialisation vector by the first client in order to obtain a decrypted name of the user account, a decrypted second public key, and a decrypted hash value of the second public key,
t) comparing, by the first client, the decrypted name of the user account with the name of the user account, decrypted second public key with the second public key of the second client, and the decrypted hash value with the hash value of the second public key of the second client.

3. The method according to claim 1, wherein step d) also comprises the step of: generating the first data packet from a time stamp, step e) also comprises the step of: decrypting the encrypted first data packet in order to obtain a decrypted time stamp, and step n) also comprises the step of: comparing the decrypted time stamp with an actual time stamp.

4. The method according to claim 2, wherein step o) also comprises the step of: generating the second data packet from a time stamp, step s) also comprises the step of: decrypting the encrypted second data packet in order to obtain a decrypted time stamp, and step t) also comprises the step of: comparing the decrypted time stamp with an actual time stamp.

5. The method according to claim 1, wherein the first hash value is generated by means of SHA-1, SHA-2 and/or SHA-3, the symmetric key has a key length≥256 bits, the password has a length≥128 bits and/or the initialisation vector has a length of ≥128 bits.

6. The method according to claim 1, wherein the encryption and/or decryption of the data packet is carried out by means of ≥AES-256.

7. The method according to claim 1, wherein the generation of the second hash value from the password is carried out with use of the initialisation vector as salt by means of ≥10 bcrypt rounds.

8. The method according to claim 1, wherein the random number has a length of ≥24 alphanumeric characters.

9. The method according to claim 1, wherein step b) comprises: presenting the random number in Base64-encoded form.

10. A method for exchanging encrypted messages between a first client and a second client, having the steps of:
authorising the second client to a server in accordance with a method according to claim 1,
encrypting a message on the first client using an asymmetric encryption method,
transmitting the encrypted message from the first client to the second client, and
decrypting the message on the second client by means of an asymmetric decryption method.

11. A computer system comprising a server having memory storing instruction executable by the server, a first client and at least one second client, wherein the server, the first client and the second client are configured in such a way that a method according to claim 1 is executed on the server, the first client and the second client.

12. A non-transitory digital storage medium having electronically readable control signals, wherein the control signals can cooperate with a programmable computer system such that a method according to claim 1 is executed.

13. A computer program product having a program code stored on a non-transitory machine-readable carrier for carrying out the method according to claim 1 when the program code is executed on a data processing device.

14. The method according to claim 2, wherein step d) also comprises the step of: generating the first data packet from a time stamp, step e) also comprises the step of: decrypting the encrypted first data packet in order to obtain a decrypted time stamp, and step n) also comprises the step of: comparing the decrypted time stamp with an actual time stamp.

15. The method according to claim 14, wherein the first hash value is generated by means of SHA-1, SHA-2 and/or SHA-3, the symmetric key has a key length≥256 bits, the password has a length≥128 bits and/or the initialisation vector has a length of ≥128 bits.

16. The method according to claim 15, wherein the encryption and/or decryption of the data packet is carried out by means of ≥AES-256.

17. The method according to claim 16, wherein the generation of the second hash value from the password is carried out with use of the initialisation vector as salt by means of ≥10 bcrypt rounds.

18. The method according to claim 17, wherein the random number has a length of ≥24 alphanumeric characters.

19. The method according to claim 18, wherein step b) comprises: presenting the random number in Base 64-encoded form.

20. The method according to claim 4, wherein the random number has a length of ≥24 alphanumeric characters.

\* \* \* \* \*

UNITED STATES PATENT AND TRADEMARK OFFICE
CERTIFICATE OF CORRECTION

PATENT NO. : 9,716,591 B2  
APPLICATION NO. : 14/649331  
DATED : July 25, 2017  
INVENTOR(S) : Harald Lemke It is certified that error appears in the above-identified patent and that said Letters Patent is hereby corrected as shown below:

In the Specification

Column 5, Line 12, please replace "256" with --$\geq$256--  
Column 5, Line 13, please replace "128" with --$\geq$128--  
Column 5, Line 27, please replace "10" with --$\geq$10--  
Column 5, Line 27, please replace "20" with --$\geq$20--  
Column 5, Line 34, please replace "24" with --$\geq$24--

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*